April 3, 1956
M. R. MAUGE ET AL
2,740,840

OUTGOING JUNCTION CIRCUIT

Filed July 23, 1952
2 Sheets-Sheet 1

Inventor
M. R. MAUGE
J. R. A. F. ESCANDE
By Robert Harding
Attorney

April 3, 1956 M. R. MAUGE ET AL 2,740,840

OUTGOING JUNCTION CIRCUIT

Filed July 23, 1952 2 Sheets-Sheet 2

Inventor
M. R. MAUGE
J.R.A.F. ESCANDE
By Robert Harding Jr.
Attorney

United States Patent Office 2,740,840
Patented Apr. 3, 1956

2,740,840

OUTGOING JUNCTION CIRCUIT

Marcel Roger Mauge and Jean Raymond Antoine Font Escande, Boulogne-Billancourt, France, assignors to International Standard Electric Corporation, New York, N. Y., a corporation of Delaware Application July 23, 1952, Serial No. 300,426
Claims priority, application France July 26, 1951
13 Claims. (Cl. 179—18)

The present invention relates to automatic switching systems and more particularly to outgoing junction circuits used for connecting central exchanges of an automatic telephone network one with another.

In the known automatic telephone systems the outgoing junction circuits at the sending exchange comprise three wires generally designated by the references *a, b, c*; only the wires *a* and *b* are used for connecting the outgoing junction circuit to the sending exchange and the incoming junction circuit to the arrival exchange, the third wire being a local wire. In the known systems, a local test on wire *c* and a distant test on wire *a* are successively made to determine the free condition of these wires. When the test of the outgoing junction circuit is made at the local exchange through a selector which remains in contact about 30 milliseconds on each terminal, it is possible to cause the two test relays to operate simultaneously, these test relays corresponding respectively to the local test and to the distant test. When the scanning of the outgoing junction circuits takes place by means of a finder which remains an average of 15 milliseconds on each terminal, it is not possible to be sure of the operation of the two test relays and it is possible to consider as busy a free circuit when the second test relay has not hand time to operate.

One of the objects of the present invention consists in overcoming these drawbacks by providing an outgoing junction circuit in which the local test and the distant test for free condition are made on the same terminal.

According to a feature of the invention an outgoing junction circuit comprises in combination, means adapted for representing the local free or busy condition by means of an electrical characteristic applied to a terminal, test means adapted for operating when the said outgoing junction is free from the local point of view, means adapted for modifying the electrical characteristic of the said terminal in function of the free or busy condition from the distant point of view of the said outgoing junction, the new electrical characteristic having two values according as the junction is free or busy from the distant point of view, and means for recognizing the new characteristic, said means being adapted for operating when the said new characteristic indicates the distant free condition of the said outgoing junction.

According to another feature of the invention, the test terminal of the outgoing junction circuit is connected through a resistance to the terminal of a battery at the local exchange and, at the distant exchange, to the terminal of a battery by a wire of the junction and a resistance.

According to another feature of the invention, the characteristic of the local free condition is obtained by connecting the said terminal to ground through a resistance which is high with respect to the resistance connected between the said terminal and the terminal of the battery.

According to another feature of the invention, the distant free condition characteristic is obtained by connecting between the said terminal and ground a resistance of the order of the resistance connected between the said terminal and the battery.

According to another feature of the invention, the busying of the circuit from the distant point of view is made by disconnecting the corresponding test terminal.

According to another feature of the invention, the busying of the circuit from the distant point of view is made by disconnecting the battery used for representing the free condition.

According to another feature of the invention the free or busy condition test is made by comparing the terminal potential with one or several predetermined potentials.

According to another feature of the invention, the potential comparing circuit is adapted for controlling the modification of the said resistance connected between the terminal and the ground and the modification of the reference potential when the circuit reached is free from the local point of view, in order to effect by potential comparison the free or busy test from the distant point of view.

Other objects, features and advantages of the present invention will appear from a reading of the following description of an embodiment of the invention, the said description being made in conjunction with the annexed drawings in which.

Figure 1:
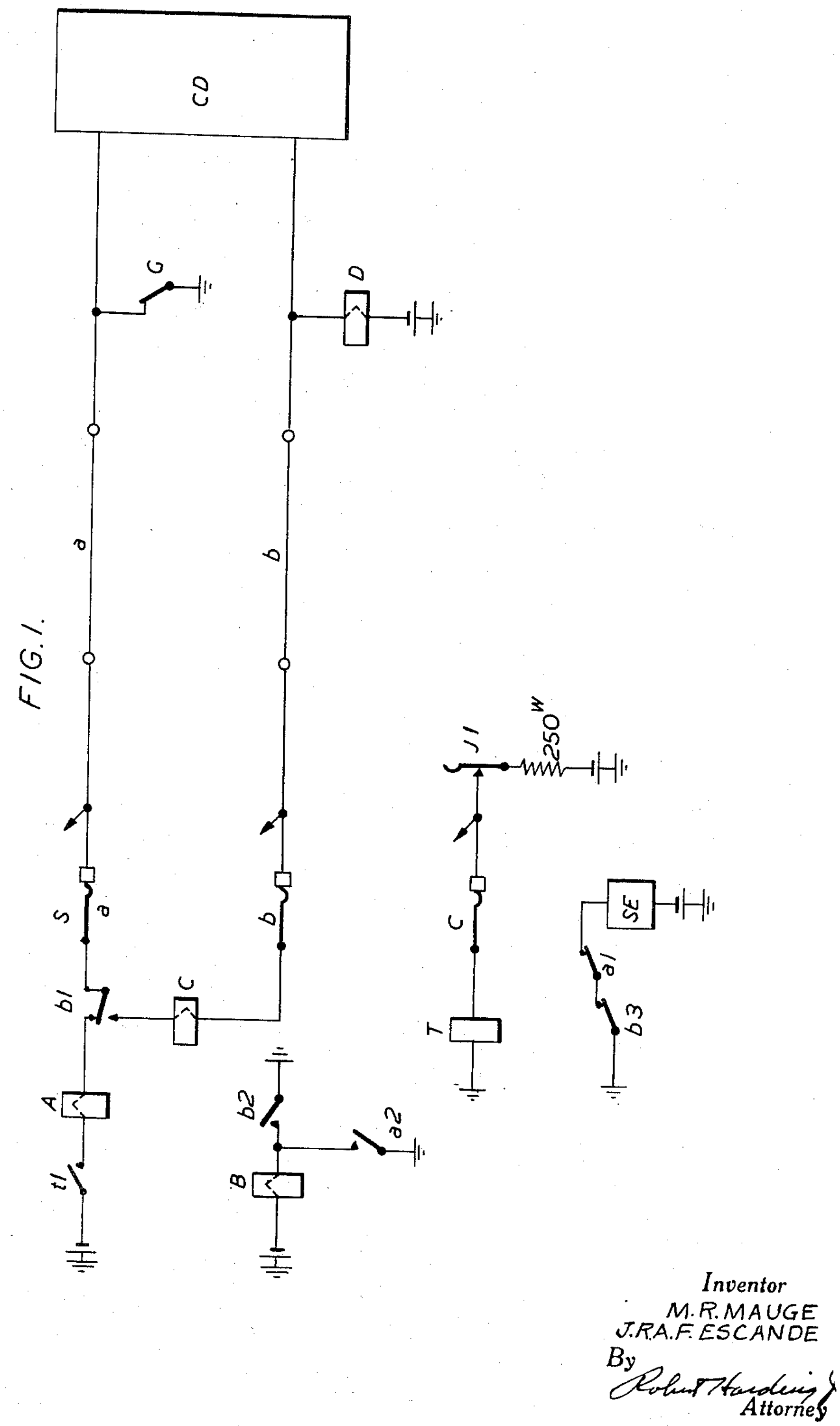
Fig. 1 represents schematically a known outgoing junction circuit.

There is shown in Fig. 1 a known outgoing junction circuit. The circuit includes group selectors and its clutching electro-magnet SE. The circuit has been represented in the state in which it is at the moment of the selection. The type of representation known under the name of "detached contacts" has been used for the relays, the winding of a relay being indicated by a capital letter, the contacts being indicated by the same small letter provided with an index. The brushes *a*, *b* and *c* of the selector S scan the corresponding terminals of the terminal bank to which are connected the outgoing junction circuits. The local free condition of an outgoing junction circuit is indicated by the fact that the terminal *c* is connected to the negative terminal of a 48 volt battery through the back contact of the jack J1 and the resistance of 250 ohms. The free condition of the corresponding distant circuit, shown on the right hand side of Fig. 1, is indicated by a direct ground connected to the wire *a* through the contact G which may be, for instance, a relay contact or a sequence switch contact and which is closed until the end of the selections. When the brush *c* meets a terminal *c* of a hunted junction, brought to a potential representing the free condition, relay T operates and closes the circuit of relay A through its contact *t1* and operating relay A in its turn, if the junction is free at the distant exchange, by means of the following circuit: battery, make contact *t1*, winding of relay A, contact *b1*, brush and terminal *a*, wire *a* of the junction, contact G, ground. Through the opening of its contact *a1*, relay A opens the operation circuit of the electro-magnet SE, thus stopping the selector S. Through its make contact *a2*, relay A closes the circuit of relay B which locks through its contact *b2* and which, through its contact *b1*, closes the following circuit: battery, winding of relay D, wire *b* of the junction, terminal and brush *b* of the selector S, winding of relay C, make contact *b1*, brush and terminal *a*, wire *a* of the junction, contact G, ground. The busying of the junction from the local point of view is realized in view of the fact that the terminal *c* of selector S is maintained at a potential lower than 48 volts. Relay D controls the starting of the distant circuit CD through contacts which have not been shown. By means of the operation of relay C, an indication is given to the local exchange over a set of contacts which have not been shown that the distant circuit has started.

Figure 2:
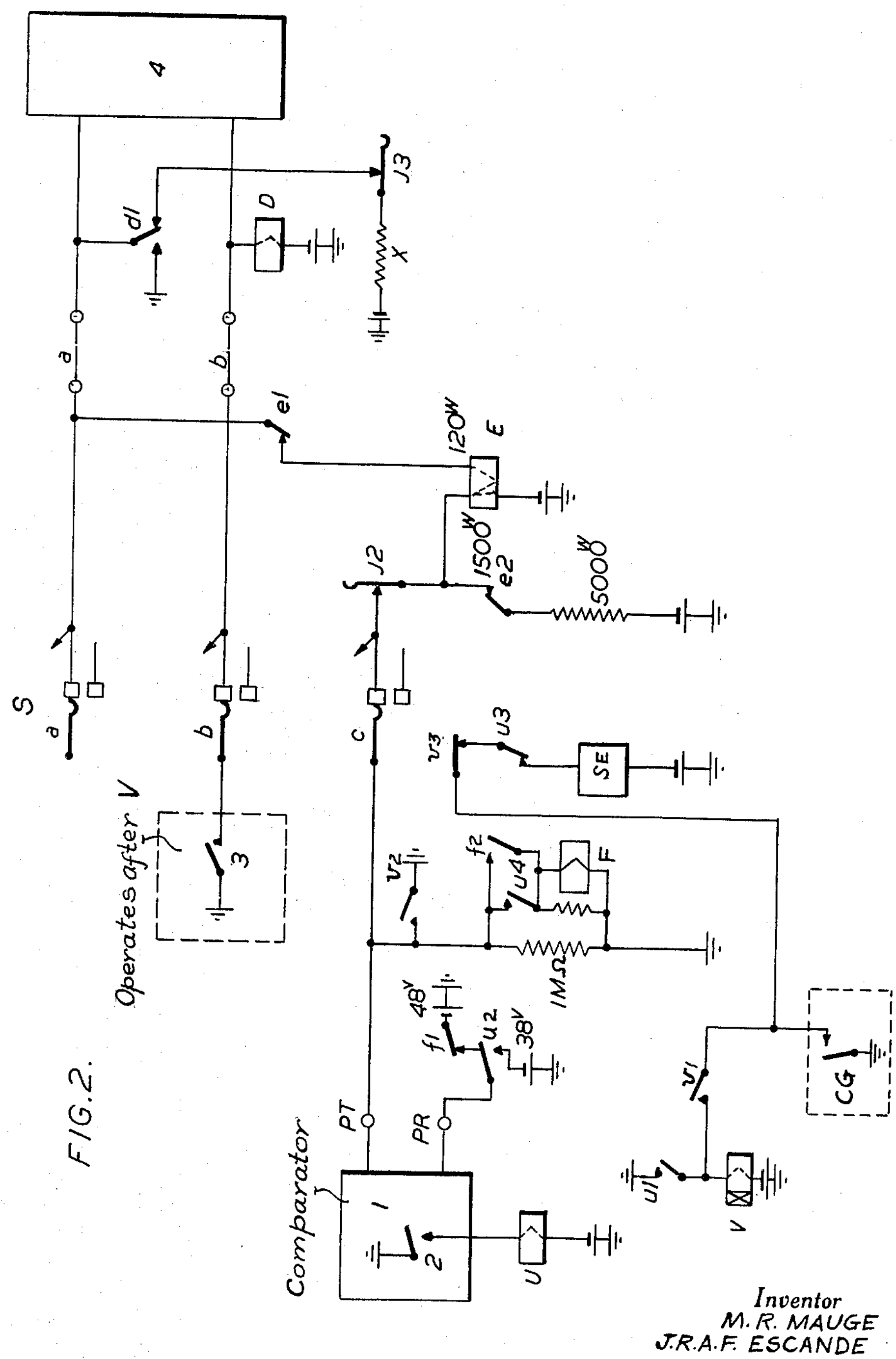
Fig. 2 represents schematically an outgoing junction circuit embodying features of the invention.

An outgoing junction circuit embodying features of the invention is shown in Fig. 2. The elements fulfilling the same function as in Fig. 1 have been designated by the same references. The wire *a* is connected, in the distant exchange, to the negative terminal of a 48 volt battery through back contact *d*1, the back contact of service jack *j*3 and resistance X. The value of this resistance is chosen so that, together with the resistance of the wire *a*, the sum will equal 850 ohms.

The wire *a* is connected in the outgoing junction circuit at the local exchange to the right 120 ohm winding of relay E through back contact *e*1. One of the extremities of the left 1500 ohm winding of relay E is connected to the negative terminal of a 48 volt battery, and the common point of the two windings is connected to the terminal *c* through the back contact of service jack J2, and through back contact $e^2$ and a resistance of 5,000 ohms to the negative terminal of a 48 volt battery.

The brush *c* of selector S is connected to the terminal PT of a potential comparing circuit, which has been represented by a schematic rectangle 1, and to ground through a resistance of 1 megohm. This potential comparator may be of any type, such as that described in U. S. patent to H. F. Herbig, No. 2,354,682, or in the patent application, Serial No. 259,026, filed November 30, 1951, for "Potential Comparator" and is adapted to close the contact 2 when the potential applied to the terminal PT is identical to the reference potential applied to the terminal PR which is normally connected through a back contact *u*2 and a back contact *f*1 to the negative terminal of a 48 volt battery.

The selector magnet SE is operated over back contacts *u*3 and *v*3 of the U and V relays to ground at a common ground contact CG which may be closed by known means, not shown. When the brush *c* meets a terminal of a hunted junction which is free, from the local exchange point of view, as well as from the distant exchange point of view, and which is therefore at —48 volts, the potential comparator 1 closes its contact 2 and relay U operates, energizing in its turn the slow operating relay V which does not operate at this time. Because of the resistance of 1 megohm between the point PT and ground, there will still be —48 volts at the point PT even if there is no battery on the *a* wire at the distant end of the junction, and the operation of the U relay indicates only that the local end of the junction is free, but does not indicate whether or not the distant end of the junction has been cut out of service by the opening of the contact of the service jack J3.

By means of its contact *u*3, relay U opens the operation circuit of the clutching electro-magnet SE of selector S and the selector S stops on the particular terminal. By means of its transfer contact *u*2, relay U modifies the reference potential by connecting the terminal PR of the potential comparator to the negative terminal of a 38 volt battery, and through the closing of its contact *u*4 it connects a resistance of 2,000 ohms in parallel with the resistance of 1 megohm. This resistance of 2,000 ohms is made up of resistance RF and a relay F in parallel with it, and by the closing of *u*4 relay F is caused to operate, whereupon it locks over contact *f*2.

If the circuit is also free from the distant point of view, it is easy to see that the potential of the terminal PT is identical with the new potential of the terminal PR, and the contact 2 of the potential comparator 1 remains closed. Relay V then operates and maintains itself over its make contact *v*1 to the ground at CG. Through its make contact *v*2, it connects a direct ground to terminal PT in order to cause relay E to operate, which relay, through the opening of its contact *e*1, disconnects the wire *c* from the junction circuit and, through the opening of its contact *e*2, disconnects the 5,000 ohm resistance from the jack J2.

The circuit is busy in view of the fact that the terminal

*c* of selector S is maintained at the ground potential and no other selector can stop on it because the potential comparator of that selector will not operate.

A contact 3 is shown inside a dotted rectangle, and this contact, when it is actuated, connects a ground to wire *b* in order to cause the operation of relay D of the distant circuit 4. The contact 3 is closed after the operation of relay V by switching means well known to those skilled in the art. Relay D starts the distant circuit 4 in a manner which has not been shown.

If the outgoing junction circuit in the local exchange is disconnected for servicing by opening the contact of the service jack J2, the terminal PT of the potential comparator is maintained at the ground potential and the relay U does not operate. In these conditions, the selector cannot stop on this terminal.

If the circuit is disconnected for servicing in the distant exchange, the contact of the service jack J3 is open. However, the terminal *c* is still at —48 volts, and when the brush *c* of the selector S meets this terminal, the potential comparator closes the contact 2 and the relay U operates, causing the modification of the reference potential through the closing of the contact *u*2. With the battery removed at the distant end and the contact *u*4 closed, the potential of the terminal *c* and therefore the potential of the point PT of the potential comparator is brought to 31 volts and relay U falls back. However, the operation of relay U has operated relay F with the result that the connection between the contact U2 and the 48 volt battery is opened by the contact *f*1. When relay U falls back, therefore, it cannot immediately operate again, so that the switch S can start its hunting again for a free junction.

If two selectors stop on the same junction, the normal effect would be to cause one of the U relays to operate before the other. By means of its U4 contact, the potential of the wire C would be changed so that the other U relay could not operate.

If both relays actually did operate at the same time the voltage on the C wire would not be —38 volts because of the operation of both U4 contacts. Hence both U relays would fall off and one of them would make its back contact before the other, whereupon it would immediately operate and prevent the other from operating.

If there should be a ground on wire *a* when the free or busy test is made, current will flow in the opposite direction through the 120 ohm winding of the relay E, but the relay will not operate under these condtions because the windings are arranged so that the fluxes are in opposition; it will only operate when relay V closes its contact *v*2.

While the principles of the invention have been described above in connection with specific embodiments and particular modifications thereof, it is to be clearly understood that the description is made only by way of example and not as a limitation on the scope of the invention.

What is claimed is:

1. An automatic switching system comprising a plurality of junctions, a selector switch having access to said junctions, driving means for causing said switch to hunt over said junctions, means for applying a predetermined potential to one wire of a free junction at the distant end thereof to represent the free condition of said distant end, means for applying a predetermined different potential to said wire at the local end thereof to represent the free condition of said local end, means connected to said selector switch and responsive to said potential applied to the local end of a junction for deenergizing said driving means to cause said switch to stop on said junction, means controlled by the operation of said responsive means for altering said responsive means to make it thereafter responsive to the potential applied to the distant end of said junction, and time delay means responsive to the continued operation of said responsive means for maintaining said driving means in the deenergized condition, whereby said switch is held on said junction.

2. An automatic switching system, according to claim 1, further comprising means actuated by the time delay means for effectively disconnecting said applied potentials from both ends of said junction.

3. An automatic switching system, according to claim 2, in which the means for effectively disconnecting the applied potentials includes a relay associated with each junction having contacts connecting the wire of the junction with the potential applying means.

4. An automatic switching system, according to claim 3, in which the responsive means comprising a potential comparing device having first and second input circuits and an output circuit and adapted to energize said output circuit when the potentials applied to the two input circuits have a predetermined relation, means for connecting said first input circuit over a wiper of the selector switch to the one wire of the junction, and means for applying a predetermined potential to said second input circuit, the means for altering the responsive means comprising means for changing said predetermined potential applied to said second input circuit to a different predetermined potential.

5. An automatic switching system, according to claim 4, in which the responsive means further comprising a first relay in the output circuit of the potential comparing device, which relay has contacts which control the various means controlled by said responsive means.

6. An automatic switching system, according to claim 5, in which the time delay means responsive to the continued operation of the responsive means comprises a slow operating relay and means including contacts of the first relay for operating said slow operating relay.

7. An automatic switching system, according to claim 6, further comprising means responsive to the operation of the slow operating relay for rendering the junction busy.

8. An automatic switching system comprising a plurality of junctions, a selector switch having sets of terminals, each set including a test terminal and a set of wipers including a test wiper, said switch having access to said junctions, driving means for causing said wipers to hunt over said terminals, each of said junctions having a test circuit at the outgoing end thereof connected to its corresponding test terminal, a switch normally connecting said test circuit to one wire of said junction, means for applying a predetermined potential to said wire at the incoming end of said junction which represents the free condition of said incoming end, means for applying a predeterminded different potential to said test circuit which represents the free condtion of the outgoing end of said junction, test means connected to said test wiper including means responsive to the presence of the potential applied to a test circuit for deenergizing said driving means and stopping said selector switch on the terminals of the junction associated with said test circuit and for altering said responsive means to make it thereafter responsive to the pontential appearing on said test terminal including that applied to the one wire of said junction at the incoming end thereof, and time delay means operated by the continued operation of said responsive means for operating said switch to disconnect said test circuit for said one wire of said junction and for maintaining said driving means deenergized so as to hold said wipers on the terminals of said junction.

9. An automatic switching system, according to claim 1, in which the responsive means comprises a potential comparing device having first and second input circuits and an output circuit, said first input circuit being connected to the one wire of said junction over a wiper of said switch, first and second predetermined different sources of potential, means for normally connecting said first source to said second input circuit, and in which the responsive means includes means for disconnecting said first predetermined source of potential from said second input circuit and connecting in place thereof said second source of potential.

10. An automatic switching system comprising a selector switch having sets of terminals including a test terminal and at least two other terminals, a set of wipers including a test wiper and at least two other wipers respectively engaging said terminals, and driving means for causing said wipers to sweep over said terminals, a plurality of outgoing junctions each having a test wire and two other wires connected to respective sets of said terminals, control means normally energizing said driving means to cause said set of wipers to sweep over said terminals to hunt for a free junction, a potential comparing device having first and second input circuits and an output circuit and means for energizing said output circuit when potentials having a predetermined relation are applied to said first and second input circuits, means for connecting said first input circuit of said potential comparing device with the test wiper of said selector switch, means for connecting a predetermined potential to said second input circuit, a circuit connecting the test wire of each junction with one of the other wires thereof, resistance means connected to said test wiper of said selector switch, a first source of potential for each junction, means including a resistor for connecting said first source between said connecting circuit of the particular junction and said resistance means when the local end of said junction is free, a second source of potential for each junction, means including a resistor for connecting said second source between said one wire of said particular junction at the distant end thereof and said resistance means when the distant end of said junction is free, whereby current will flow through said resistance means and produce a potential on said first input circuit of said comparing means when said wipers rest on the terminals connected to said junction, said resistors being so adjusted as to make said potential equal to said predetermined potential, means in the output circuit of said potential comparing device, responsive to the energization thereof, for operating said control means so as to deenergize said driving means and stop said wipers on the terminals connected to said junction, means also controlled by said responsive means for disconnecting said predetermined potential from said second input circuit of said pontential comparing means and connecting thereto a different predetermined potential, means also controlled by said responsive means for materially reducing the value of said resistance means, whereby the potential of said first input circuit of said potential comparing device will be the same as said different predetermined potential as long as said second source of potential is connected to said one wire of said junction, whereby said responsive means will continue to be energized, and time delay means controlled by the continued energization of said responsive means for opening the circuit connecting said test wire of said junction with said one wire thereof.

11. An automatic switching system, according to claim 10, in which the means responsive to the energization of the output circuit of the potential comparing device comprises a first relay and the various means controlled thereby are contacts of said relay.

12. An automatic switching system, according to claim 11, in which the time delay means controlled by the continued energization of the responsive means is a slow operating relay and means including contacts of the first relay for energizing said slow operating relay.

13. An automatic switching system, according to claim 12, further comprising means responsive to the operation of the slow operating relay for rendering the junction busy.

References Cited in the file of this patent

UNITED STATES PATENTS 2,093,242 Humphries et al. ________ Sept. 14, 1937